United States Patent [19]

Sato

[11] 4,413,386
[45] Nov. 8, 1983

[54] CONNECTING DEVICE FOR END OF ROPE OR BAR AND METHOD FOR PRODUCING THEREOF

[76] Inventor: Soichiro Sato, 3728 Oaza Nishihonjoji, Sanjo-shi, Niigata-pref., Japan

[21] Appl. No.: 338,979

[22] Filed: Jan. 12, 1982

[51] Int. Cl.³ .................. B66C 1/34; F16G 11/14
[52] U.S. Cl. .................. 24/230.5 R; 29/456; 294/82 R
[58] Field of Search .................. 294/78 R, 82 R; 24/230.5 R, 231; 29/456, 517, 520

[56] References Cited

U.S. PATENT DOCUMENTS

| | | | |
|---|---|---|---|
| 997,488 | 7/1911 | Campbell | 294/78 R |
| 1,706,481 | 3/1929 | Chadderdon | 294/78 R |
| 2,218,431 | 9/1940 | Sloan et al. | 294/82 R |
| 2,275,162 | 3/1942 | Sutthoff | 294/78 R |
| 2,620,160 | 12/1952 | Ray | 294/82 R |
| 2,828,156 | 3/1958 | Hansen | 294/78 R |
| 3,082,500 | 3/1963 | Moreau | 24/129 W |
| 3,358,857 | 12/1967 | Vogel et al. | 294/82 R |
| 3,471,904 | 10/1969 | Aho | 24/115 |
| 3,525,542 | 8/1970 | Belart et al. | 29/520 |
| 3,561,071 | 2/1971 | Schlein | 24/131 |
| 3,748,723 | 7/1973 | Tomioka | 29/517 |
| 3,861,811 | 1/1975 | Mason et al. | 24/115 A |
| 4,019,770 | 4/1977 | Poelma et al. | 294/82 R |
| 4,039,219 | 8/1977 | Wirkkala | 294/78 R |
| 4,333,675 | 6/1982 | Bugman | 294/82 R |

FOREIGN PATENT DOCUMENTS

| | | | |
|---|---|---|---|
| 807393 | 1/1952 | Fed. Rep. of Germany | 29/456 |
| 642474 | 9/1950 | United Kingdom | 294/82 R |
| 1216342 | 12/1970 | United Kingdom | 29/520 |

*Primary Examiner*—Paul J. Hirsch
*Attorney, Agent, or Firm*—Schwartz & Weinrieb

[57] ABSTRACT

A connecting device for a rope or bar to be connected to a threaded bolt, includes a coupling threaded at one end for threaded engagement with the threaded bolt and having a radially inwardly extending annular shoulder at its other end. A sleeve swaged onto the end of the rope or bar is disposed within the coupling and engages the shoulder thereof so as to prevent disengagement therefrom. A hard metal coil and a soft metal sleeve are interposed between the rope or bar and the first sleeve for achieving enhanced gripping of the sleeve to the rope or bar.

6 Claims, 10 Drawing Figures

CONNECTING DEVICE FOR END OF ROPE OR BAR AND METHOD FOR PRODUCING THEREOF

BACKGROUND OF THE INVENTION

1. Field of the Invention

The present invention relates to a connecting device for the end of a rope or bar and a method for producing thereof, and more particularly to connecting the end of the wire rope or the iron bar with a hook or bolt in an efficient and adequate manner.

2. Prior Art

A hanel-splice-method that splices the end of a wire rope by hand and makes a ring for connecting it is well-known, but this method has the disadvantage of requiring a great deal of skill to splice it. An aluminum-lock-method, which turns up the end of the wire rope and presses it by a sleeve made of aluminum, has been disclosed, but it is expensive due to the cost of the press and other instruments. A wire-rope-socket-method, which pours molten metal into a socket arranged upon the end of the wire rope, has also been disclosed, but this is disadvantageous in that such tends to damage the rope around the socket. Other prior art systems make a ring for connecting the end of the rope, however, they have the disadvantage of becoming loose due to a large load.

SUMMARY OF THE INVENTION

Accordingly, it is a primary object of the present invention to provide a connecting device for the end of the rope of simple inexpensive design which is easily connected, and including a tightly pressed sleeve upon the end of the rope, and free of the aforementioned defects, especially of becoming loose of the rope end due a large load.

It is another object of the present invention to provide a method for producing a rope or bar connector which is efficient, adequate and capable of being manufactured everywhere.

Other and further objects of the present invention will become obvious upon an understanding of the illustrative embodiments about to be described or will be indicated in the in the appended claims, and various advantages not referred to herein will occur to one skilled in the art upon employment of the invention in practice.

BRIEF DESCRIPTION OF THE DRAWINGS

The foregoing features and advantages of the present invention will be apparent from the following detailed description taken in conjunction with the accompanying drawings in which.

DESCRIPTION OF ILLUSTRATIVE EMBODIMENTS

Figure 1:
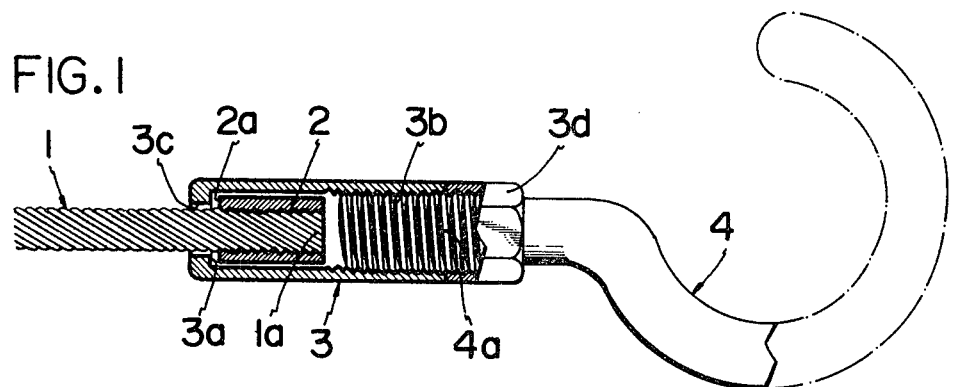
FIG. 1 is a side elevation with the ends coupled, showing the coupling and sleeve in longitudinal section.

Referring now in detail to the drawings, FIG. 1 shows particularly the connection construction between the wire rope 1 and the hook 4. This is the first embodiment of the present invention. The wire rope 1 engages at one end a sleeve 2 having preferably a flat or square shoulder as seen at 2a to have a flat bearing against the inner end 3a of the coupling. A connecting coupling 3 may be of any suitable material and is preferably in the form of a cylinder having at one end an opening 3C through which passes one end of wire rope 1 together with the sleeve 2, and against the inner end 3a of this end the flat or square shoulder 2a of the sleeve engages. The other inner face of the coupling 3 is provided with a thread 3b which is fitted therein and adapted to receive the threaded end 4a of the hook 4. This thread 4a is removably held within the end of the coupling; preferably being threaded upon its periphery to engage interior threads on the coupling 3 as well as lock nut 3d, which is screwed onto the thread 4a of the hook 4 prior to insertion of hook 4 within the coupling 3, which is subsequently screwed against the outside face of coupling 3. The threaded end 4a of the hook 4 is enabled to employ larger threads and thus increase the life of the same. The materials of the ropes may be made of not only metal wires but also a nylon and vinyl or cotton. In case of using the rope made of plastic materials, it is preferable to pass the rope through a soft metal sleeve, as aluminum or lead, interposed between the rope and the inner face of the sleeve 2, in order to increase the engaging strength between the sleeve 2 and the rope.

The parts are assembled by first inserting the coupling 3 upon the threaded end 4a of the hook 4 and sliding it around until the sleeve 2 engages the inner end 3a of the coupling, and then the thread 3b is placed within the threaded end of the hook 4 and secured. Then the device is ready for use. To remove or change a hook 4 the coupling 3 is screwed off the threaded end of the hook 4. The new hook 4 or the bolt is engaged with the thread 3b and screwed up sufficiently to prevent disengagement of the parts.

Figure 2:
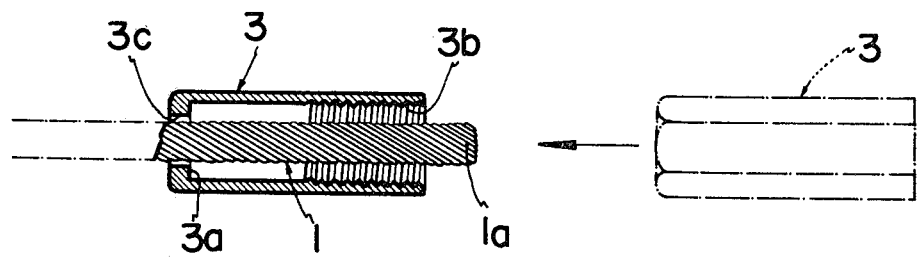
FIG. 2 is a sectional view showing the coupling to pass through one end of the wire rope.

The method of the invention according to the first embodiment will be more completely understood by references in detail to the drawings which show one form of a press indicated generally at FIG. 2 to 7, suitable for the practice thereof. FIG. 2 shows particularly the process of this invention's method for engaging the sleeve 2 with the end of the wire rope which is connected with the hook 4. Referring to FIG. 2, there is shown the coupling 3 which is passed over the end of the wire rope, the lock nut 3d being loosely disposed upon the coupling 3 before the sleeve 2 is engaged with the coupling shoulder 3a.

Figure 3:
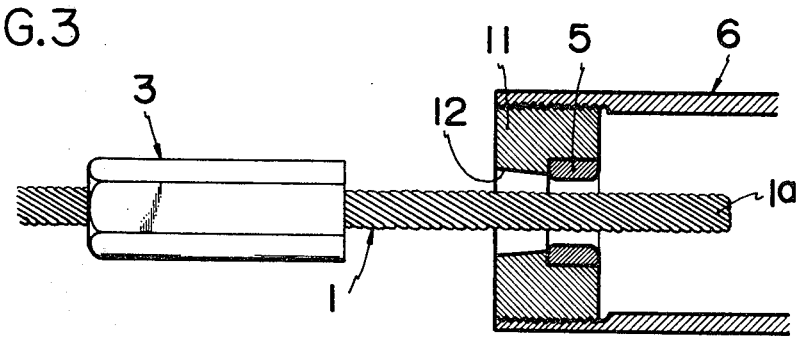
FIG. 3 is a side elevation with the coupling passed through the wire rope, showing the swaging machine in longitudinal section.
Figure 4:
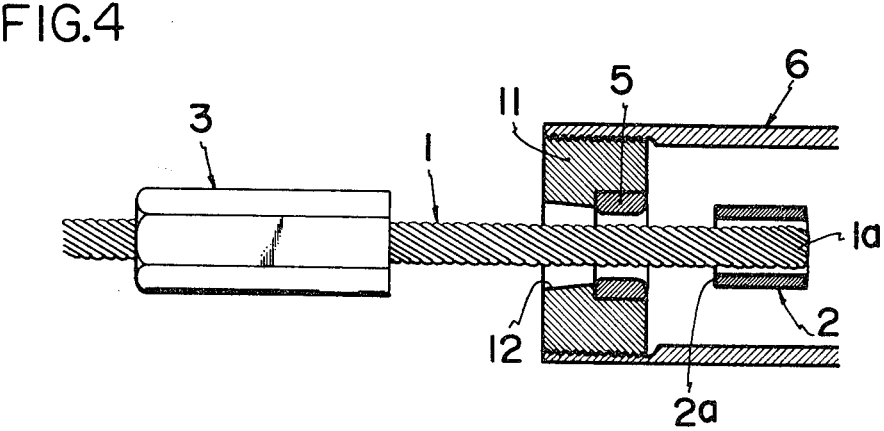
FIG. 4 is a side elevation with the coupling passed through the wire rope, showing the sleeve passed through one end of wire rope in the swaging machine in longitudinal section.
Figure 5:
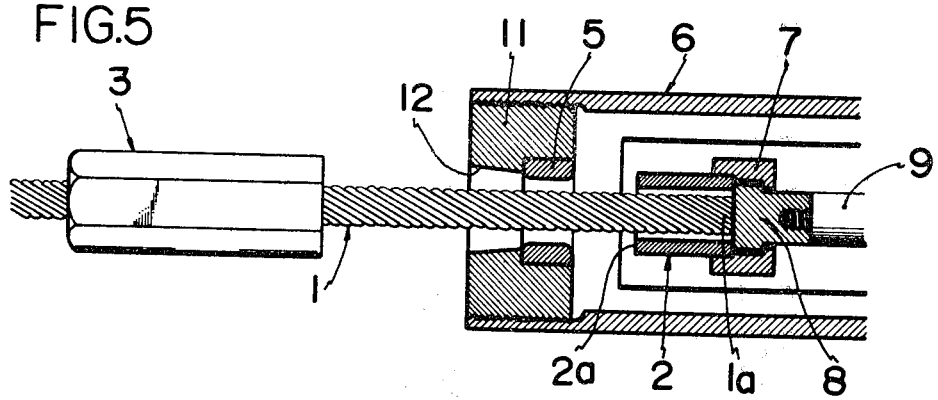
FIG. 5 is a side elevation with the coupling passed through the wire rope, showing the punch holding up the coupling in the swaging machine in longitudinal section.
Figure 6:
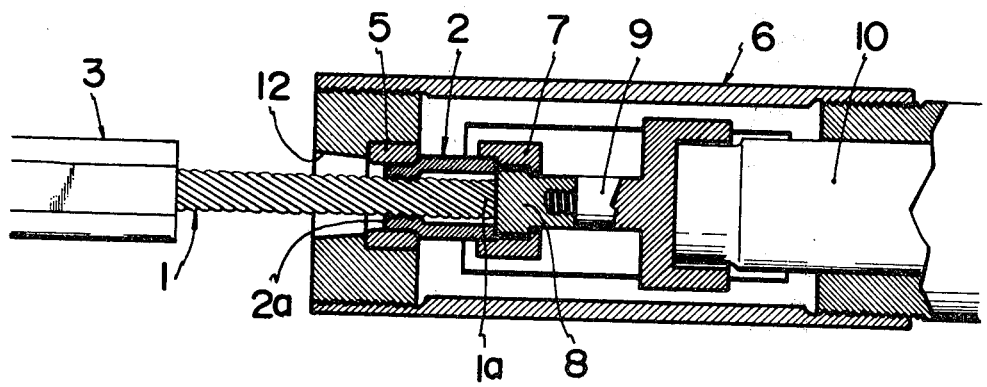
FIG. 6 is a side elevation with the coupling passed through the wire rope, showing the die swaging the sleeve at the end of the wire rope, in the swaging machine in longitudinal section.
Figure 7:
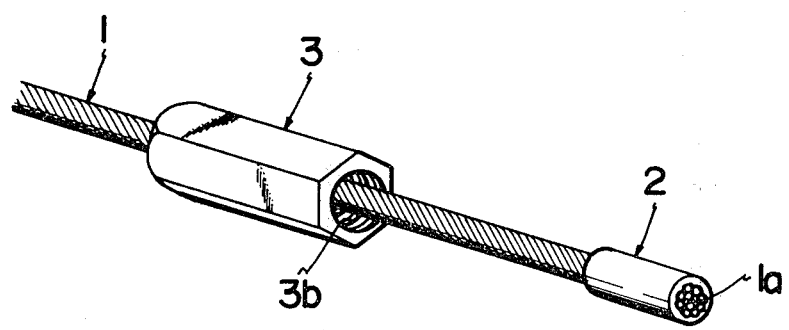
FIG. 7 is a perspective view with the coupling passed through the wire rope, showing the coupling fixed one end of the wire rope.

Turning next to a consideration of FIG. 3 to 5 of the drawings, there are illustrated therein the process of the present invention which includes the end of the wire rope 1 passed into the die 5 of the swaging machine 6 as shown in FIG. 3, the sleeve 2 is passed over the end 1a of the wire rope 1 as shown in FIG. 4 and held on the cylindrical holding means 7 attached to the punch 8 of the piston 9 in the swaging machine as shown in FIG. 5. The punch 8 is engaged with the piston 9 of to the oil-cylinder 10 in the swaging machine as shown in FIG. 6, which also depicts the sleeve 2 which is fixedly arranged on the holding means 7 through the end opening of the swaging machine 6. The wire rope 1 then is rolled, pressed and swaged by means of the die 5 which is engaged on the end wall 11 of the swaging machine 6 having the opening 12.

Further, the punch 8 and the holding means 7 push and press the sleeve 2 together with the wire rope 1 in the axial direction of the wire rope 1 through the die 5 for the sleeve 2 and the wire rope 1 to prevent such combination from being forced together eccentrically.

Figure 8:
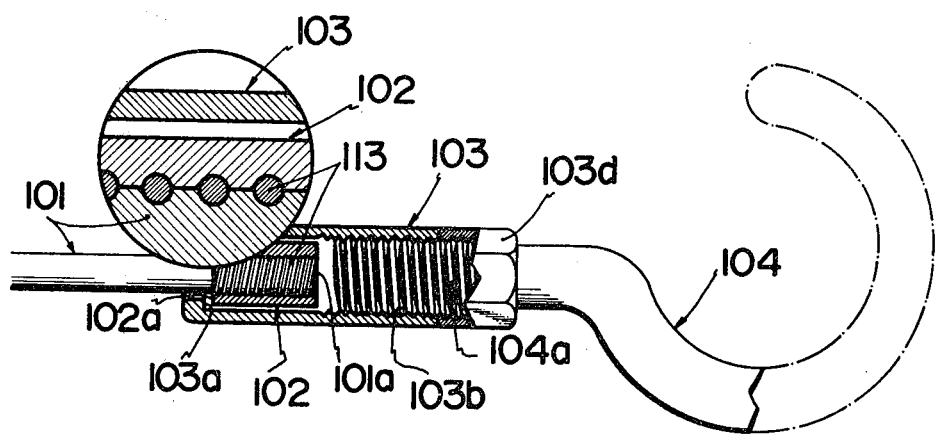
FIG. 8 is a detailed portion cross sectional and broken view with a grossly enlarged partly sectional view in the second embodiment.
Figure 9:
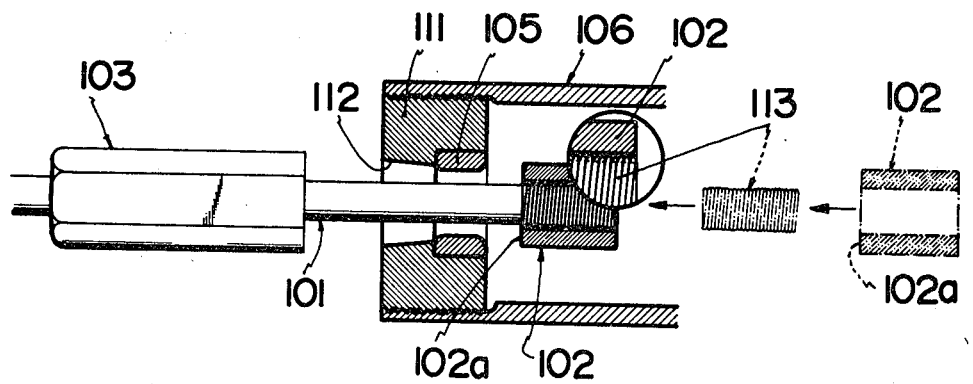
FIG. 9 is a side elevation with the coupling passed through the iron bar, showing the sleeve passing through the end of the iron bar with the coil.

The second embodiment according to this invention will be more completely understood by references in detail to the drawings which show one form of a construction indicated generally at FIG. 8 and 9, and characterized with the coil 113 twined round the end of the iron bar 101 or the wire rope, the other constructions and process being the same as the first embodiment. The coil 113 may be twined about the bar, or capable to be twined round the inner face of the sleeve beforehand. The coil 113 is arranged between the end of the bar 101 and is the inner face of the sleeve 102, and swaged by means of the die 105 of the swaging machine 106. The coil 113 gets interwined with the thread of the wire rope or the surface of the iron bar and unites tightly the iron bar or wire rope with the sleeve; preferably the coil 113 is best when tightly and closely coiled. The materials of the coil 113 are preferably a hard metal, plastics and ceramics.

Figure 10:
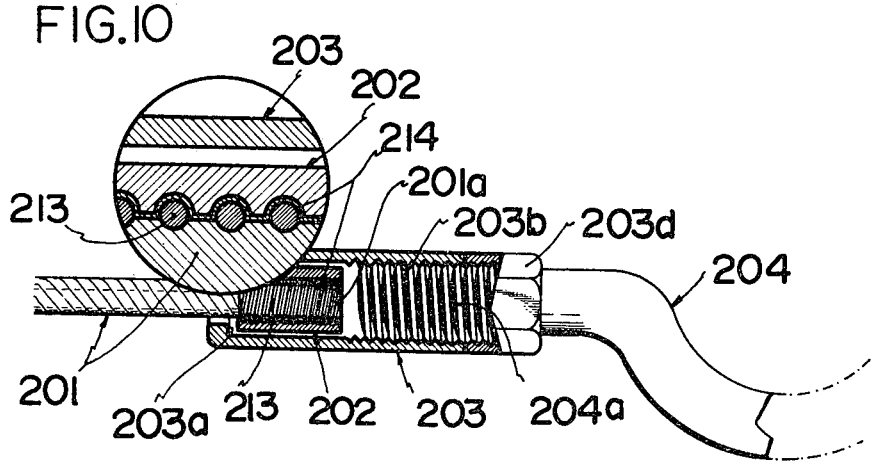
FIG. 10 is a detailed portion cross sectional and broken view with a grossly enlarge partly sectional view in the third embodiment.

The third embodiment according to this invention is shown as a construction indicated at FIG. 10, and characterized with the soft sleeve 214 engaged among the wire rope 201, the coil 213 and the sleeve 202. The soft sleeve 214 is made of such soft metals as zinc or aluminum material and serves to fill up the clearance among them and fix them after the swaging machine swages and presses the sleeve 214.

It will be apparent that other presses can be substituted for the specific press 8 illustrated and described herein, and that various other changes and modifications can be made in the method of the invention without departing from the spirit of the Claims.

I claim:

1. A system for connecting a rope or bar to a threaded bolt, comprising:
    a rope or bar member;
    a bolt member having a portion thereof externally threaded;
    a tubular coupling member having one end thereof internally threaded for engagement with said externally threaded portion of said bolt member, the other end of said coupling member being provided with a radially inwardly extending annular shoulder portion; and
    a sleeve member, having an outside diameter less than the inside diameter of said tubular coupling yet greater than the inside diameter of said annular shoulder portion, fixed onto said rope or bar member by means of a coil member, interposed between said rope or bar member and said sleeve member and embeddedly disposed within said rope or bar member and said sleeve member, and a malleable sleeve interposed between said coil member and said sleeve member, as well as within the interstices defined between successive spirals of said coil member so as to also be interposed between said rope or bar member and said sleeve member.
2. The system as set forth in claim 1, wherein:
    said rope member comprises metal wire.
3. The system as set forth in claim 1, wherein:
    said rope member is fabricated from plastic material.
4. The system as set forth in claim 1, wherein:
    said rope member is fabricated from cotton-thread material.
5. The system as set forth in claim 1, wherein:
    said bolt member comprises a support hook element.
6. The system as set forth in claim 1, wherein:
    said end of said rope or bar member having said sleeve member secured thereon is longitudinally movably disposed within said coupling member.

* * * * *